June 29, 1926.

Re. 16,370

I. L. ROBERTS

PROPELLER

Original Filed Oct. 15, 1918 2 Sheets-Sheet 1

Inventor:
Isaiah L. Roberts

By Byrnes Townsend & Brickenstein

Attorneys.

June 29, 1926. Re. 16,370

I. L. ROBERTS

PROPELLER

Original Filed Oct. 15, 1918 2 Sheets-Sheet 2

Inventor:

Isaiah L. Roberts

By Byrnes Townsend & Brickenstein

Attorneys.

Patented June 29, 1926. Re. 16,370

UNITED STATES PATENT OFFICE.

[illegible] E. ROBERTS, OF COLUMBUS, ISLE OF PINES, CUBA, ASSIGNOR OF ONE-HALF TO WILLIAM C. LICHTENSTEIN, OF JERSEY CITY, NEW JERSEY.

PROPELLER.

Original No. 1,262,544, dated April 7, 1918, Serial No. 258,166, filed October 15, 1918. Application for reissue filed April 6, 1926. Serial No. 100,746.

My invention relates to a new and useful propeller for use in propelling ships or boats.

Heretofore all propellers known to me have blades which follow some uniform geometrical formula throughout their entire length and breadth as the screw or inclined plane. In order to get the highest efficiency from this form of propeller the blades must be made thick near the hub and comparatively thin in extension.

If the blade is supported by a thick arm the support offers a resistance instead of a help in operation. When made wide enough to support the blade and thick enough to offer the minimum resistance to passing through the water it offers a large surface to the water when in motion and if the boat does not move forward in unison with the pitch of the propeller the action of all that portion of the propeller blade more or less distant from the hub then acts more or less as a churn or merely whirls the water and thus is consuming power uselessly. It is difficult to keep adjusted the speed of such propeller to the forward movement of the boat so that high efficiency may be attained and if attained under favorable engine power and clean boat surface these conditions are difficult to maintain constantly in practice. Hence in practice owing to change of engine power and to fouling of hull or difference in speed owing to a light or heavy cargo which naturally varies the speed of the boat, propellers now made can not be uniformly of equal efficiency in practice.

What has been said above is not so true of that portion of the blade from the center or midway out to the end. This portion of a propeller is really the working part and yields vastly more thrust or push to the vessel than the portion between the middle of the blade and the hub; so much so that if the blade is made of a uniform width and pitch the thrust increases as the square of the distance from the center of the circle described by said blade in turning. Furthermore, all bladed screw propellers known to me have the widest part of their blades near their centers and from thence taper more or less to rounded points, thus losing or failing to secure propelling surface and supporting surface against slip at the most useful and advantageous point in the entire blade.

In all propellers there is a further loss of power due to slipping.

My invention has for its object the design of a propeller which avoids and overcomes to a large extent the above difficulties and increases the efficiency or thrust of the propeller over a plain screw at all speeds of the boat or propeller.

In order to accomplish these results a radical departure has been made in the general design and construction of my propeller, a description of which follows wherein like letters refer to like parts in the accompanying drawings in which.

Figure 1:
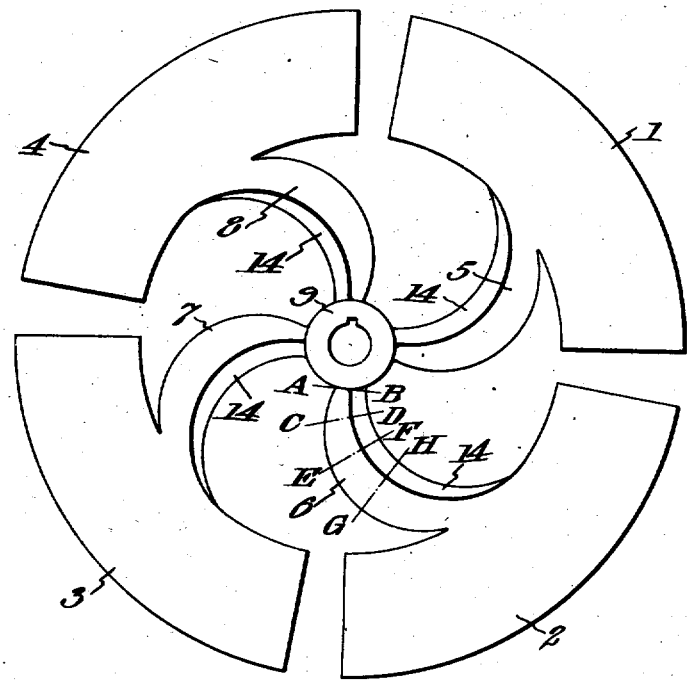
Figure 1 is a plan view of a 4-armed propeller.
Figure 3:
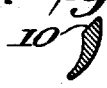
Figures 3, 4, 5 and 6 are sections on the planes A—B, C—D, E—F, and G—H, respectively indicated in Figure 1.
Figure 4:
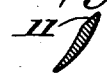
Figure 5:
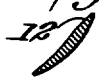
Figure 6:
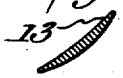

Referring to Fig. 1, the propeller is shown as consisting of four blades, 1, 2, 3 and 4, connected by curved arms 5, 6, 7 and 8 to a hub 9.

The arms 5, 6, 7 and 8 are not only formed on a curved axis, but their rearward or thrust surfaces are concaved or formed as warped surfaces, whose chords are set on pitch lines co-ordinating with pitch lines of the helicoidal blades. These concave surfaces are so shaped in order that they may act as propelling surfaces tending of themselves to act as propellers as well as means for supporting the blades located at their outer ends. The arms, 5, 6, 7 and 8 are made with tapering trailing edges, the surfaces 14 being inclined to the concave surfaces, the elements of these surfaces being indicated at 10, 11, 12 and 13 in Figs. 3 to 6. The opposite or forward faces of the arms are formed with surfaces as indicated in Figs. 3 to 6, the effect of this construction being to facilitate the flow of water thereover.

The arms 5, 6, 7 and 8, as a whole are inclined to the longitudinal axial plane of the hub 20, and made thin at their advancing edges so as to provide an easy entrance into the water, and the arms are axially curved into approximately semicircular form, because the sharper the curve the less resistance is offered in revolving in the water. By the construction of the arms in the manner described, I provide with relatively small arms an adequate support for the blades which offer the least resistance in turning, and at the same time obtain additional propelling effect with a minimum of obstruction to the passage of the water through the central portion of the propeller.

The concave arms 5, 6, 7, 8 terminate in blades 1, 2, 3, 4, whose working surfaces are circumferentially extending portions of helicoids, and both the inner and outer edges of these blades extend along helices having the same pitch.

A propeller made in the form shown in the drawings and described above yields a much higher efficiency than any other known to me. The arms yield a proportional return of thrust for the power applied to them as do the terminal blades and have greater resistance to slip than plain arms or a helix. Their form and the ejecting of the water to the rear in lines directly opposed to the progress of the boat, causes an equal straight thrust at all times.

The rear termination of the concavity of the arms pointing directly rearward produces a greater efficiency than can be obtained if the water is ejected at any angle to the line traversed by the boat in its progress. The convexity of the opposite side to the concavity produces a suction when the arm is rotating and this suction is in front of the arms and in the direction the boat is traveling and materially adds to the thrust. The curve of said arm in an arc of a circle minimizes the resistance to the passage or rotary movement thereof through the water. The concavity further greatly strengthens the arms and necessitates less metal in construction. The angular projections at 10, 11, 12, 13 rearward on the arms shown, add strength to the arms and being tapered to a sharp angle rearwardly tend to prevent cavitating at high speeds.

The blades in area greatly exceed their respective arms or supports. The objects of making said vanes of such area is twofold. The propelling force of any propeller is greatest at its greatest distance from the center of the hub, area for area thereof, considered; also the quantity or area of cross-section of water cut through in revolving is greatest and as the water is the abutment against which the propeller gets its thrust it is important to secure as large an abutment as possible.

No exact rule can here be given for the percentage of area of these blades to the cylinder of water cut in the rotation of the entire propeller; but tests show that the aggregate projected area of all the blades gives highly efficient results when this area is about forty to sixty per cent of the projected area of the propeller. This percentage may however be varied for conditions of use. In the case of towing, where the speed of the boat is slow and a strong pull is required, blades of larger area may be used, while on high speed boats blades of smaller area may be used to advantage. The greater the area the less will be the slip.

The high efficiency of a propeller constructed as above described is due to several factors, which include (1) the form and arrangement of the arms, whereby there is afforded easy passage of the water through the central portion of the propeller, as the boat advances, with the lowest resistance to or disturbance of this central column of water; (2) the fact that the arms though relatively small yet exert considerable thrust operative, because of the form of the concavity, to force the water straight back; (3) the relatively large area of blade surface located at the greatest possible distance from the axis, whereby slip is lessened to a high degree; and (4) the exact curvature of the edges of the blades to the curve of the spiral through which they travel in rotating.

This large area of blade and arm surface working effectively against the water, as an abutment, further obviates, to a large degree, the necessity for nice adjustment of the pitch of the propeller blades to the lines or speed of the particular vessel on which the propeller is to be used, and the efficiency of the propeller is maintained within a wide range of variation of speed of travel of the boat or of variation in the rate of rotation of the propeller.

It will be noted, further, that the major portion of the area of the propeller is located at its outer or peripheral part and preferably beyond an imaginary cylindrical surface having a radius of about five-eighths that of the propeller as a whole. The blades lie approximately between two limiting cylindrical surfaces or in cylinders co-axial with the propeller.

The diameter of the propeller, as herein shown and described, is 16 inches and the pitch is 22 inches, which may however be made greater or less according to the speed at which the boat is designed to go. As the rearward concave warped surfaces of the propeller arms have the same pitch as the working blade surfaces and these surfaces merge into each other, the propeller as a whole closely approaches the ideal condition of a screw working into the water as into a solid nut. This ideal condition is more closely approximated because of the particular construction of the arm portions. which permit a free flow of water past them.

Figure 2:
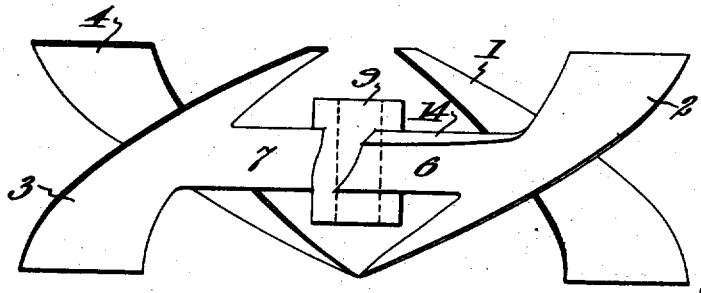
Figure 2 is an elevation of Figure 1.
Figure 7:
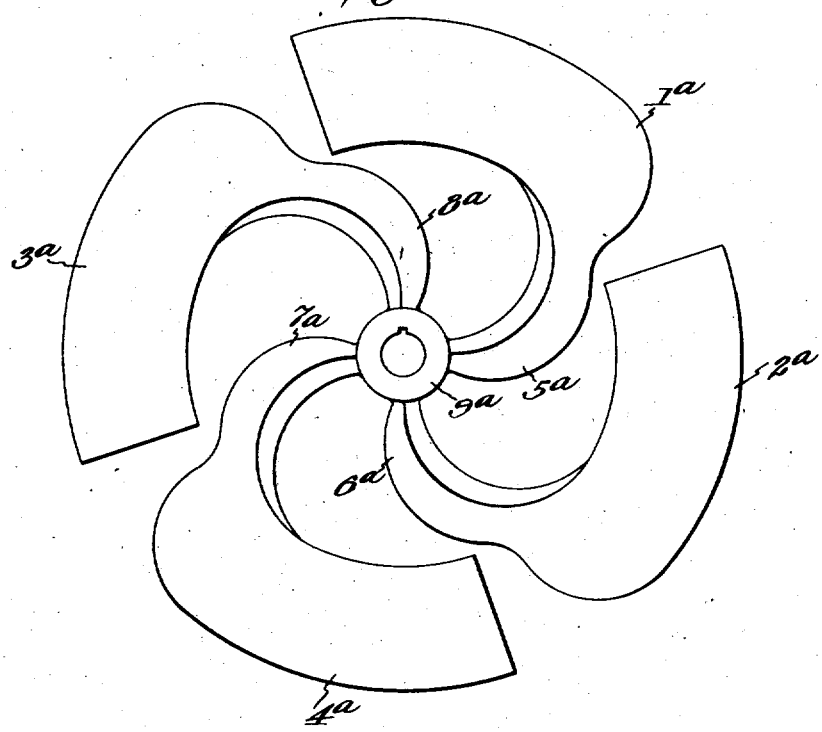
Figure 7 is a plan view of a modified form.
Figure 8:
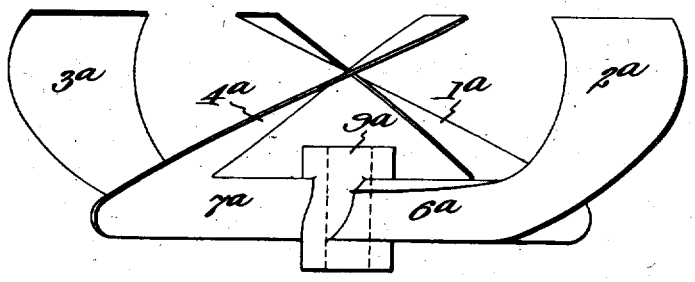
Figure 8 is an elevation of Figure 7.

The form of the propeller shown in Figs. 1 and 2 may be modified to that shown in Figs. 7 and 8, which operates in the same manner, but has the advantage that there is less liability of the blades catching in ropes or weeds.

In the form shown in Figs. 7 and 8, the arm-portions $5^a$, $6^a$, $7^a$, $8^a$ are of the same construction and arrangement as the arms 5, 6, 7, and 8; but the blades $1^a$, $2^a$, $3^a$, $4^a$ are extended, as shown, to one side only of the arm, the area of the blades being however substantially the same as that of the blades shown in Fig. 1.

While I have shown a 4-blade propeller, obviously any different number of blades may be used as conditions of use may require. Nor is my invention limited to strictly helicoidal surfaces for the working surfaces of the arms and the blades, as slight variations from this form may be made without departure from the spirit of my invention.

I claim:

1. A propeller comprising a plurality of circumferentially and axially extending helicoidal blades and arms lying in substantially the same radial plane connecting the blades to the shaft, said arms having concaved propelling surfaces whose cords are set on pitch lines co-ordinating with the pitch lines of the helicoidal blades.

2. Propeller according to claim 1 in which the arms are axially curved, their convex edges pointing in the direction of rotation.

3. Propeller according to claim 1 in which the concave propelling surface of each arm is defined by progressively varying radii of curvature, the radius being shortest adjacent the hub and longest adjacent the line of union with the blade.

In witness whereof I have subscribed my name to this specification.

ISAIAH L. ROBERTS.